Nov. 5, 1946.  C. B. MOORE  2,410,671
PNEUMATIC COMPARATOR GAUGES
Filed July 2, 1943
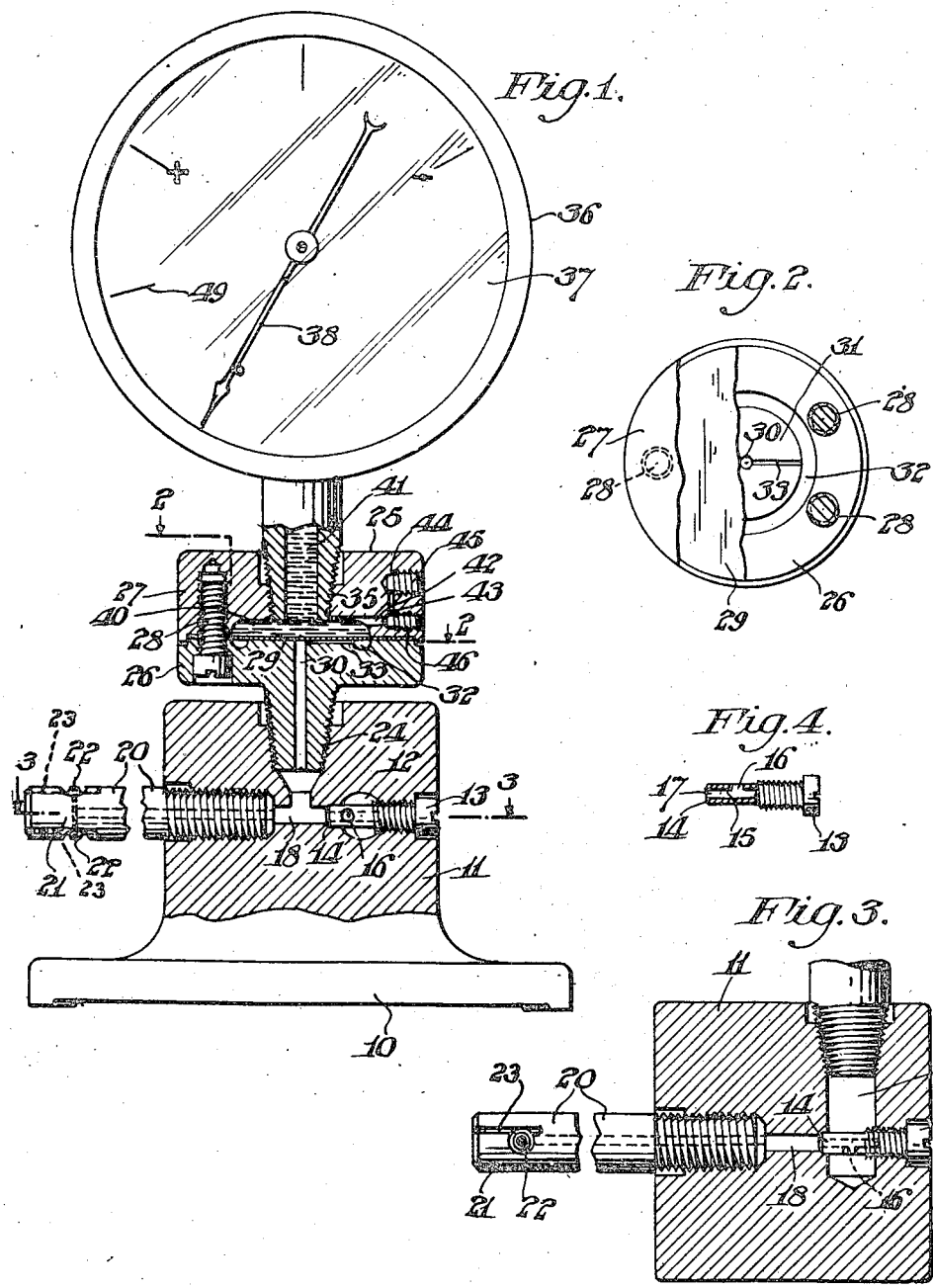
Inventor:
Coleman B. Moore,
By Z. T. Wolbensmith 2nd
Attorney.

Patented Nov. 5, 1946

2,410,671

UNITED STATES PATENT OFFICE 2,410,671

PNEUMATIC COMPARATOR GAUGES

Coleman B. Moore, Carroll Park, Pa., assignor to Moore Products Co., Philadelphia, Pa., a co-partnership Application July 2, 1943, Serial No. 493,213

4 Claims. (Cl. 33—178)

This invention relates to pneumatic comparator gauges and more particularly to improvements in the construction and operation of such gauges.

Pneumatic gauges have heretofore been proposed operating upon the principle that if a gaseous fluid under constant pressure is forced through a pair of orifices, in series with one another, the gaseous pressure in the space between the orifices will be a function of the relative sections of the orifices, and the measurement of this gaseous pressure will, within certain limits, indicate the effective section of the discharge orifice as determined by the position of the work with respect thereto.

In most of the gauges of this type heretofore available, the interior space, within which the measured pressure was effective, was excessive in size. This resulted in slow speed response characteristics which limited the productive capacity of the gauge. Furthermore, in pneumatic gauges heretofore available no provision has been made for cushioning the indicator upon its return to zero following the removal of the work being gauged.

It is the principal object of the present invention to provide a pneumatic comparator gauge which will have a very high speed of response.

It is a further object of the present invention to provide a pneumatic comparator gauge with adequate provisions for cushioning the indicator.

It is a further object of the present invention to provide a pneumatic comparator gauge which will have a high order of sensitivity together with a high speed of response and concurrently provide adequate protection for the movable parts used with the gauge.

It is a further object of the present invention to provide an attachment suitable for use with pneumatic gauges heretofore constructed for improving the characteristics thereof.

It is a further object of the present invention to provide a pneumatic comparator gauge in which the movement of the indicator to indicating position will be dead beat.

Other objects of the invention will be apparent from the annexed specification and claims.

The nature and characteristic features of the invention will be more readily understood from the following description, taken in connection with the accompanying drawing forming part hereof, in which:

Figure 1 is a side view partly in elevation and partly in vertical central section illustrating the main features of the present invention;

Fig. 2 is a horizontal sectional view taken approximately on the line 2—2 of Fig. 1;

Fig. 3 is a horizontal sectional view taken approximately on the line 3—3 of Fig. 1; and Fig. 4 is a view partly in elevation and partly in section illustrating certain details of the restriction member.

It will, of course, be understood that the description and drawing herein are illustrative merely, and that various modifications and changes may be made in the structure disclosed without departing from the spirit of the invention.

Referring more particularly to the drawing the pneumatic comparator gauge therein illustrated is of the internal type for measuring bores although the invention is not limited to internal gauges.

The gauge illustrated includes a base 10 having an upstanding portion 11 with a supply connection 12 to which fluid at substantially constant pressure, preferably pressure regulated and filtered air, is supplied.

The supply connection 12 is in communication with the interior of a restriction member in the form of a restriction screw 13 which is removable for cleaning. The restriction screw 13 has a seat 14 at the inner end thereof and has a hollow interior 15 in communication with the supply connection 12 through one or more openings 16. The interior space 15 is terminated at the inner end with a constriction in the form of a port 17 of predetermined bore for effecting a reduction of pressure of the supply fluid. The constriction or port 17 is in communication with a central passageway 18 in the base portion 11.

The upstanding base portion 11 carries, preferably on one side thereof, a gauge plug unit 20 which, as illustrated, is intended for measuring the internal bore of the work. The gauge plug 20 has a gauge portion 21 of predetermined length in accordance with the requirements of the work to be gauged and of predetermined external diameter in accordance with the internal bore of the work to be gauged. The gauge plug 20 includes nozzle openings 22 which are in communication with the central passageway 18 and are of predetermined diameter or cross section to permit of the discharge of fluid as modified by the internal dimensions of the work to be gauged when positioned on the gauge plug unit. The gauge plug 20 also has fluid escape grooves 23 for the exhaust of the fluid from the nozzles 22.

The base portion 11 also has threaded therein at 24 a sealing unit 25 which consists of a lower body portion 26 and an upper body portion 27 secured together by bolts 28 and with a flexible diaphragm 29 therebetween. The lower body portion 26 preferably has a central opening 30 in communication with the central passageway 18 and has an upper flat face 31 with an annular groove 32 therearound. A vent slot 33 of a very small size is provided across the face and connects the groove 32 and the central opening 30.

The upper body portion 27 has a central threaded opening 35 for the reception of the threaded connection of a pressure gauge 36. The pressure gauge 36 may be of any preferred type, such for example as the Bourdon type. The pressure gauge 36 has the operating range of the dial 37 calibrated as desired, in terms of maximum and minimum size limits indicated as + and —, or in dimensional units such as thousandths and ten thousandths of inches, or otherwise in accordance with the gauging requirements and for indication by an indicator 38.

The upper body portion 27 also has a chamber 40, of the same external diameter as the groove 32, in communication with the interior portions 41 of the pressure gauge 36 within which the fluid whose pressure is to be determined is contained. The interior pressure responsive portions 41 of the gauge 36 and the chamber 40 are filled with a suitable fluid, preferably a non-compressible liquid having a relatively low coefficient of expansion. The filling liquid is at a predetermined pressure above atmospheric but preferably less than that of the supply pressure at the connection 12. Passageways 42, 43 and 44 are provided for filling and the passageways are closed by screws 45 and 46, and sealed after filling.

The mode of operation of the gauge of the present invention will now be pointed out. Gauging fluid at predetermined constant pressure, such as pressure regulated and filtered air, is supplied to the supply connection 12 and passes through the restriction member 13 with a reduction of the pressure thereof. The fluid passes through the central passageway 18 and discharges through the nozzles 22. The pressure prevailing at the central passageway 18 is effective through the central opening 30 and against the lower face of the diaphragm 29. The pressure of this fluid, when the diaphragm 29 is seated, is effective only on the area of the diaphragm at the central opening 30 and, by reason of the leakage through the vent slot 33, on the area of the diaphragm 29 at the groove 32.

The pressure exerted by the liquid on the upper face of the diaphragm 29 is sufficient to keep the diaphragm 29 seated on the face 31 when air is freely discharging through the nozzles 22. The indicator is at its zero position as illustrated.

Upon placing the work to be gauged upon the gauge plug 21, the discharge through the nozzles 22 will be determined by the radial spacing of adjoining portions of the work from the nozzle terminals. The restriction of the discharge through the nozzles 22 causes an increase of the pressure in the central passageway 18 and an equilibrium pressure is quickly established for a particular dimensional location in the work piece. This pressure is effective through the central opening 30 and against the lower face of the diaphragm 29 and is sufficient to move the same to an extent that it is out of contact with the face 31. This pressure is transmitted by the liquid above the diaphragm 29 and in the interior portions 41 of the pressure gauge 36 and the indicator 38 is positioned with respect to the dial 37 in accordance with the dimensions of the portion of the work alined with the nozzles 22. The use of the liquid in the interior portions 41 of the pressure gauge 36 obviates overtravel of the indicator needle 38 and the same operates "dead beat."

Upon the removal from the gauge plug 21 of the work being gauged, the restriction upon the discharge through the nozzles 22 is removed and the pressure in the passageway 18 decreases. The decrease in pressure in the passageway 18 is effective through the central opening 30 and on the underside of the diaphragm 29. The pressure on the upper face of the diaphragm 29 forces the diaphragm 29 downwardly and it comes into contact with the face 31 first at the central portion 30. The diaphragm 29, upon coming in contact with the face 31, shuts off the discharge through the central opening 30, except to the limited extent permitted by the vent slot 33 and the discharge continues at the reduced rate determined by the size of the vent slot 33. The diaphragm 29 subsequently comes to rest in contact with the face 31 after the residual fluid is discharged through the vent slot 31. The rapidity of discharge is dependent upon the size of the vent slot and the volume and pressure at the groove 32. The cushioning point, i. e. the point at which the cushioning becomes effective upon the return movement of the indicator 38, is determined by the pressure of the liquid in the interior portions 41 of the pressure gauge 36. This determines the length of the cushioning range and the extent of movement of the indicator 38 within that range. The cushioning range indicated by way of illustration lies between the cushioning point indicated at 49 and the zero point on the dial 37. Within the cushioning range the indicator 38 does not give an accurate indication of dimensional characteristics. The cushioning is effected only on the return or down stroke of the indicator 38 and not on the up stroke. On rapid gauging the indicator 38 may pick up before it has reached its zero position.

The decrease of the effect of volume connected to the central passageway 18, which heretofore has normally included the volume of the interior portions 41 of the pressure gauge 36 greatly increases the speed of action without reducing the sensitivity and accuracy in the gauging range.

I claim:

1. In a pneumatic comparator gauge, a body member having a fluid space therein, means for supplying gauging fluid thereto, means for controlling the discharge from said space in accordance with the dimensions of the work to be gauged, a fluid passageway in communication with said space, means for indicating the pressure in said fluid space, a fluid pressure responsive member interposed between said indicating means and fluid space and controlling the discharge through said fluid passageway, and a vent passageway in communication with said fluid passageway for controlling the flow of fluid into said passageway when the same is closed by said pressure responsive member.

2. In a pneumatic comparator gauge, a body member having a fluid space therein, means for supplying gauging fluid thereto, means for controlling the discharge from said space in accordance with the dimensions of the work to be gauged, a fluid passageway in communication with said space and terminating at a pressure chamber, a fluid pressure responsive member forming a wall of said pressure chamber and controlling the discharge from said chamber through said fluid passageway, and a vent passageway in communication with said fluid passageway for controlling the flow of fluid into said passageway when the same is closed by said pressure responsive member.

3. In a pneumatic comparator gauge, a body member having a fluid space therein, means for supplying gauging fluid thereto, means for controlling the discharge from said space in accordance with the dimensions of the work to be gauged, a fluid passageway in communication with said space and terminating at a pressure chamber, a fluid pressure responsive member forming on one side thereof a wall of said pressure chamber and controlling the discharge through said fluid passageway, a vent passageway in communication with said fluid passageway for controlling the flow of fluid into said fluid passageway when the same is closed by the pressure responsive member, and a pressure gauge for indicating the pressure on said pressure responsive member, the interior pressure responsive portions of said pressure gauge being filled with liquid.

4. In a pneumatic comparator gauge, a body member having a fluid space therein, means for supplying gauging fluid thereto, means for controlling the discharge from said space in accordance with the dimensions of the work to be gauged, a fluid passageway in communication with said space and terminating at a pressure chamber, a fluid pressure responsive member forming a wall of said pressure chamber and controlling the discharge from said pressure chamber through said fluid passageway, a vent passageway in communication with said fluid passageway for controlling the flow of fluid into said passageway when the same is closed by said pressure responsive member, and a pressure gauge for indicating the pressure on said pressure responsive member.

COLEMAN B. MOORE.